(12) United States Patent
Zimmer et al.

(10) Patent No.: US 7,496,961 B2
(45) Date of Patent: Feb. 24, 2009

(54) METHODS AND APPARATUS TO PROVIDE NETWORK TRAFFIC SUPPORT AND PHYSICAL SECURITY SUPPORT

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 725 days.

(21) Appl. No.: 10/685,882

(22) Filed: Oct. 15, 2003

(65) Prior Publication Data

US 2005/0086523 A1 Apr. 21, 2005

(51) Int. Cl.
| | |
|---|---|
| G06F 11/00 | (2006.01) |
| G06F 12/16 | (2006.01) |
| G06F 15/18 | (2006.01) |
| G06F 1/26 | (2006.01) |
| G06F 11/30 | (2006.01) |
| G06F 12/14 | (2006.01) |
| G08B 23/00 | (2006.01) |
| G08B 13/00 | (2006.01) |
| G08B 21/00 | (2006.01) |
| G08B 29/00 | (2006.01) |
| H04L 9/32 | (2006.01) |

(52) U.S. Cl. .............. 726/23; 726/24; 726/25; 726/34; 713/188

(58) Field of Classification Search .................. 726/23, 726/25, 34
See application file for complete search history.

(56) References Cited

U.S. PATENT DOCUMENTS

| | | | | |
|---|---|---|---|---|
| 4,975,950 | A * | 12/1990 | Lentz ........................... 726/24 |
| 5,559,960 | A * | 9/1996 | Lettvin .......................... 726/24 |
| 5,802,277 | A * | 9/1998 | Cowlard ....................... 726/22 |
| 5,835,726 | A * | 11/1998 | Shwed et al. ................ 709/229 |
| 6,134,665 | A * | 10/2000 | Klein et al. .................. 713/300 |
| 6,182,223 | B1 * | 1/2001 | Rawson ........................ 726/22 |
| 6,434,697 | B1 * | 8/2002 | Leyda et al. .................... 713/2 |
| 6,795,926 | B1 * | 9/2004 | Matula et al. ................ 713/300 |
| 6,867,068 | B2 * | 3/2005 | Hashimoto .................. 438/110 |
| 2002/0083344 | A1 * | 6/2002 | Vairavan ...................... 713/201 |
| 2003/0061497 | A1 | 3/2003 | Zimmer |
| 2003/0093579 | A1 | 5/2003 | Zimmer et al. |
| 2003/0145228 | A1 * | 7/2003 | Suuronen et al. ............ 713/201 |

(Continued)

OTHER PUBLICATIONS

Using kernel hypervisors to secure applications, Mitchem, T.; Lu, R.; O'Brien, R.;Computer Security Applications Conference, 1997. Proceedings., 13th Annual, Dec. 8-12, 1997 pp. 175-181.*

(Continued)

*Primary Examiner*—Kimyen Vu
*Assistant Examiner*—Randal D Moran
(74) *Attorney, Agent, or Firm*—Hanley, Flight & Zimmerman, LLC

(57) ABSTRACT

Methods and apparatus to provide network traffic support and physical security support are described herein. In an example method, a virtual machine monitor (VMM) in a processor system is initialized. At least one of a network traffic intrusion event and a physical security intrusion event is identified by the VMM. At least one of a network traffic support and a physical security support is implemented in response to at least one of the network traffic intrusion event and the physical security intrusion event.

11 Claims, 6 Drawing Sheets

U.S. PATENT DOCUMENTS

2003/0163723 A1* 8/2003 Kozuch et al. .............. 713/200
2004/0111596 A1* 6/2004 Rawson, III ................... 713/1

OTHER PUBLICATIONS

Mitchem, T.; Lu, R.; O'Brien, R; Using Kernel Hypervisors to Secure Applications, IEEE, Dec. 1997 pp. 175-181.*

Extensible Firmware Interface Specification, Intel Corporation, Version 1.10, Dec. 1, 2002, 1084 pages.

Extensible Firmware Interface Specification, Version 1.10, Specification Update, Intel Corporation, Version -001, Nov. 26, 2003, 63 pages.

* cited by examiner

METHODS AND APPARATUS TO PROVIDE NETWORK TRAFFIC SUPPORT AND PHYSICAL SECURITY SUPPORT

TECHNICAL FIELD

The present disclosure relates generally to network security, and more particularly, to methods and apparatus to provide network traffic support and physical security support.

BACKGROUND

To prevent outsiders (e.g., "hackers") from accessing a network, firewalls and/or intrusion detection systems (IDS) are installed in the network. A firewall is a program or a set of related programs typically located at a network server that protects the resources of the network from other networks. In particular, the firewall examines each network packet to determine whether to forward the network packet to its destination. For example, the firewall may stop all incoming traffic from the Internet but allow outgoing traffic. While the firewall may be adequate to protect the network from outside intrusions, an IDS may be more suited to protect the network from internal intrusions. For example, the IDS may recognize an attack that is undetected by the firewall because the firewall serves as a fence between the network and the Internet but does not screen information from within the network.

Today, firewalls and/or IDS are parts of the main operating system (OS) in the network. If the main OS is exploited and breached by a hacker and/or a virus, the lines of code implementing the firewalls and/or IDS may be vulnerable and exposed as well. Thus, using currently-available OS-based firewalls and/or IDS, the network may be left unprotected from outside and/or inside intrusions.

DETAILED DESCRIPTION

Although the following discloses example systems including, among other components, software or firmware executed on hardware, it should be noted that such systems are merely illustrative and should not be considered as limiting. For example, it is contemplated that any or all of the disclosed hardware, software, and/or firmware components could be embodied exclusively in hardware, exclusively in software, exclusively in firmware or in some combination of hardware, software, and/or firmware.

Figure 1:
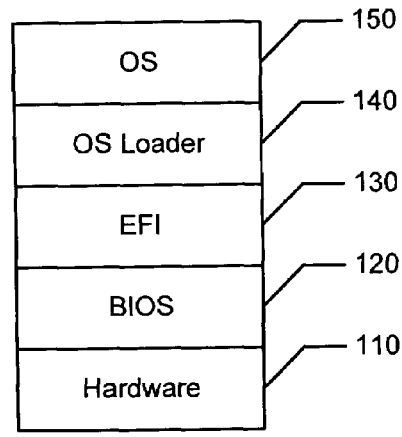
FIG. 1 is a block diagram representation of an example architectural hierarchy of a network traffic system.

In the example of FIG. 1, the illustrated architectural hierarchy 100 of a network traffic system (e.g., one shown as 200 in FIG. 2) includes hardware 110, a basic input/output system (BIOS) 120, an extensible firmware interface (EFI) 130, an operating system (OS) loader 140, and an OS 150. Persons of ordinary skill in the art will readily recognize that hardware 110 may include any physical aspect of the network traffic system such as the processor and the main memory (e.g., shown as 720 and 730, respectively, in FIG. 7). Hardware 110 also includes interface circuit(s), input device(s), output device(s), and/or mass storage device(s). The BIOS 120 may be implemented as software, firmware, or machine readable instructions configured to boot up (i.e., start up) the network traffic system in a conventional manner.

To boot the OS 150 (e.g., Microsoft Windows® or Linux) and to run pre-boot applications, the BIOS 120 manages data flow between the OS loader 140 and the hardware 110 of the network traffic system via the EFI 130. To assist the BIOS 120 in managing data flow, the EFI 130 is used to define an interface between the OS 150 and platform firmware. The EFI 130 consists of data tables containing platform-related information. The EFI 130 also includes boot and runtime service calls that are available to the OS 150. Accordingly, the EFI 130 provides a standard environment for booting the OS 150 and running pre-boot applications. Additional information pertinent to the EFI 130 is available at http://developer.intel.com/technology/efi. Alternatively, the BIOS 120 may directly communicate with the OS 150 in a conventional manner without the EFI 130.

Figure 2:
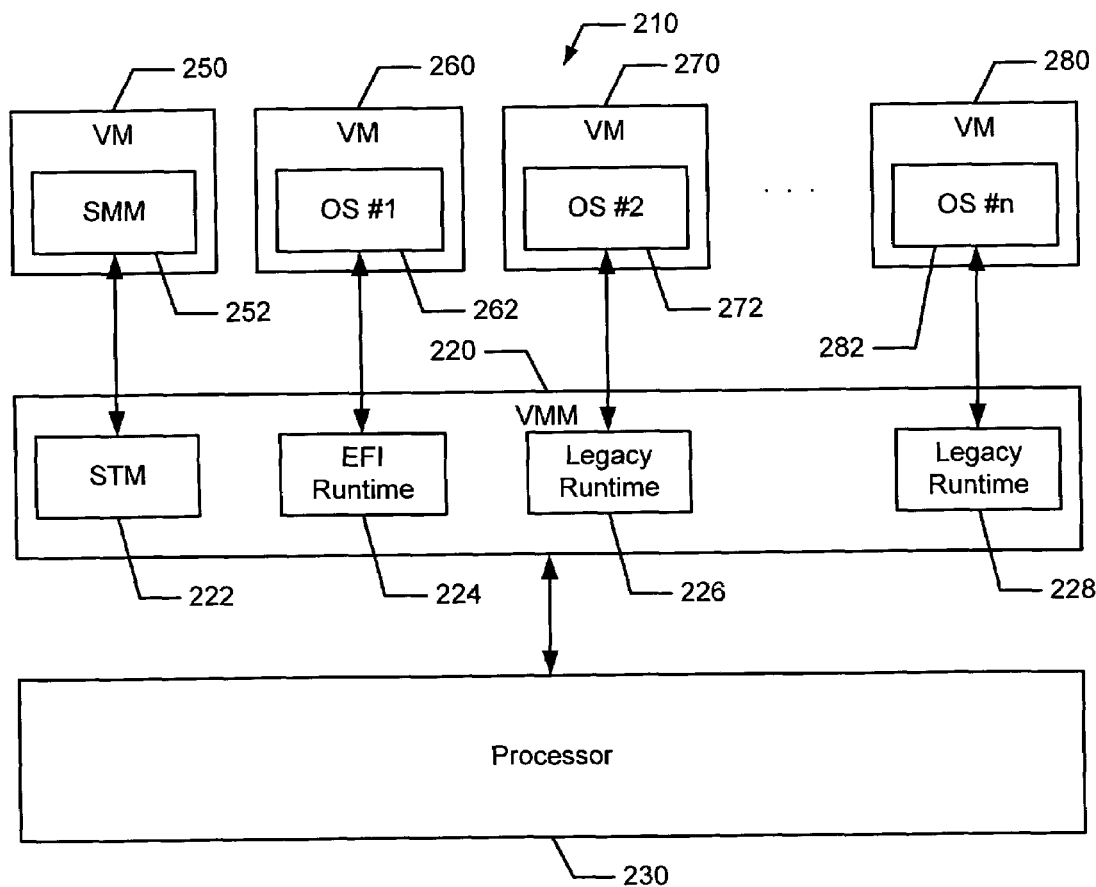
FIG. 2 is a block diagram representation of an example network traffic system.

In the example of FIG. 2, the illustrated network traffic system 200 includes a plurality of virtual machines (VM) 210, a virtual machine monitor (VMM) 220, and a processor 230. The network traffic system 200 may be a part of the Internet and/or a private internal network. As used herein "Internet" refers to a worldwide system of computer networks (i.e., a network of networks). The plurality of VMs 210 are generally shown as 250, 260, 270, and 280. Each of the plurality of VMs 210 operates like a complete physical machine that can run its own operating system. That is, different operating systems and/or separate instances of the same operating system may be executed in each of the plurality of VMs 210. For example, the VM 250 may include a system management mode (SMM) 252 of the original equipment manufacturer (OEM). The VM 260 may include OS #1 262 such as Windows XP, the VM 270 may include OS #2 272 such as Windows 95, and the VM 280 may include OS #3 282 such as Linux. Typically, an operating system crashing in one of the plurality of VMs 210 may not affect the operating systems in another one of the plurality of VMs 210 because the plurality of VMs 210 are isolated from each other. For example, Windows XP in VM 260 and Linux in VM 280 may not be affected by Windows 95 crash in VM 270.

The VMM 220 may include a system transfer monitor (STM) 222, an EFI runtime 224, legacy runtime, generally shown as 226 and 228, and/or other suitable drivers. The VMM 220 is configured to enable and support the plurality of VMs 210 by running on the processor 230. The VMM 220 ensures that the operation of each of the plurality of VMs 210 do not interrupt the operation of the network traffic system 200. In particular, the VMM 220 takes control of the network traffic system 200 when one of the plurality of VMs 210 attempts to perform an operation that may affect other VMs 210 and/or the processor 230.

Figure 3:
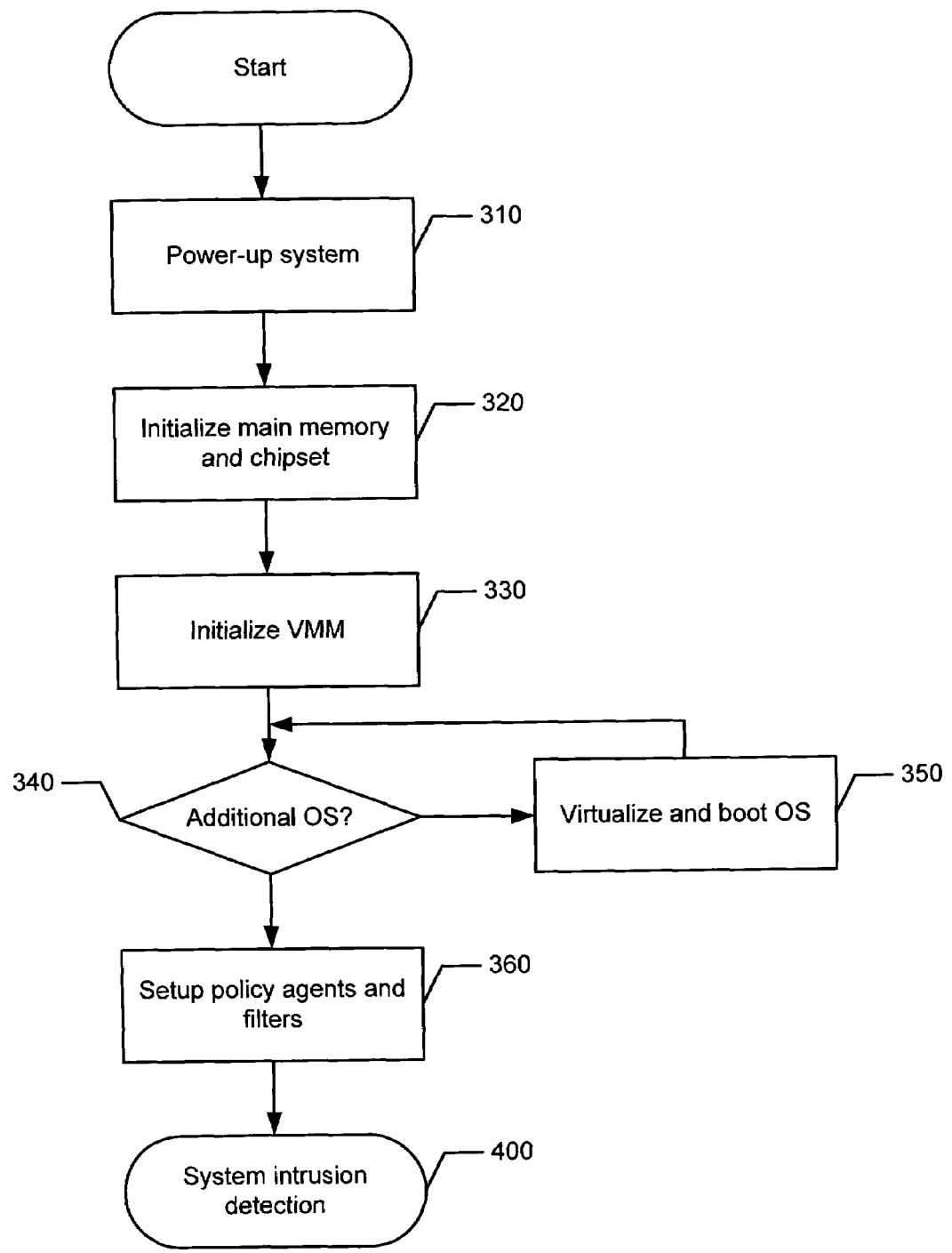
FIG. 3 is a flow diagram representation of example machine readable instructions that may filter network traffic of the example network traffic system shown in FIG. 2.

A flow diagram 300 representing machine readable instructions that may be executed by a processor to provide network traffic support and physical security support is illustrated in FIG. 3. Persons of ordinary skill in the art will appreciate that the instructions may be implemented in any of many different ways utilizing any of many different programming codes stored on any of many computer-readable mediums such as a volatile or nonvolatile memory or other mass storage device (e.g., a floppy disk, a CD, and a DVD). For example, the machine readable instructions may be embodied in a machine-readable medium such as an erasable programmable read only memory (EPROM), a read only memory (ROM), a random access memory (RAM), a magnetic media, an optical media, and/or any other suitable type of medium. Alternatively, the machine readable instructions may be embodied in a programmable gate array and/or an application specific integrated circuit (ASIC). Further, although a particular order of actions is illustrated in FIG. 3, persons of ordinary skill in the art will appreciate that these actions can be performed in other temporal sequences. Again, the flow diagram 300 is merely provided as an example of one way to provide network traffic support and physical security support.

In the example of FIG. 3, the network traffic system 200 is initialized in response to power-up (block 310). After power-up, the processor 230 executes instructions of the BIOS 120 to boot the network traffic system 200. That is, the processor 230 loads drivers to install and/or initialize components in the network traffic system 200 such as disk drives, video controllers, keyboard, mouse, etc.

The processor 230 calls on installed protocols to enable components in the network traffic system 200. In particular, the chipset including an input/output (I/O) controller and the main memory (i.e., shown as 1010 and 1030, respectively, in FIG. 7) are initialized (block 320). The processor 230 tests whether hardware 110 such as memory, peripherals, and/or disk drives are functioning properly prior to booting the OS 150. For example, the I/O controller (one shown as 1014 in FIG. 7) may check whether a keyboard and/or a mouse is connected to the network traffic system 200. In another example, the I/O controller may check whether a disk is inserted into a disk drive.

The processor 230 also initializes the VMM 220 (block 330). That is, the OS loader 140 is initialized to boot up the OS 150. The processor 230 determines whether to boot up additional OS (block 340). If there are additional OS to boot up, the processor 230 virtualizes and boots up the additional OS (block 350). In particular, the processor 230 partitions resources of the network traffic system 200 by creating a plurality of VMs 310. Each of the plurality of the VMs 310 operates as if the all resources of the network traffic system 200 are at its disposal. As a result, OS #1 362, OS #2 372, and/or OS #3 382 may be booted concurrently.

If there are no additional OS to boot up, the processor 230 sets up policy agents and filters such as security applications (block 360). For example, the processor 230 may set up network and/or physical intrusion detection, and/or virus scanning. The processor 230 proceeds to monitor for network traffic intrusion event(s) and/or physical security intrusion event(s) of the network traffic system 200 (block 400).

Figure 4:
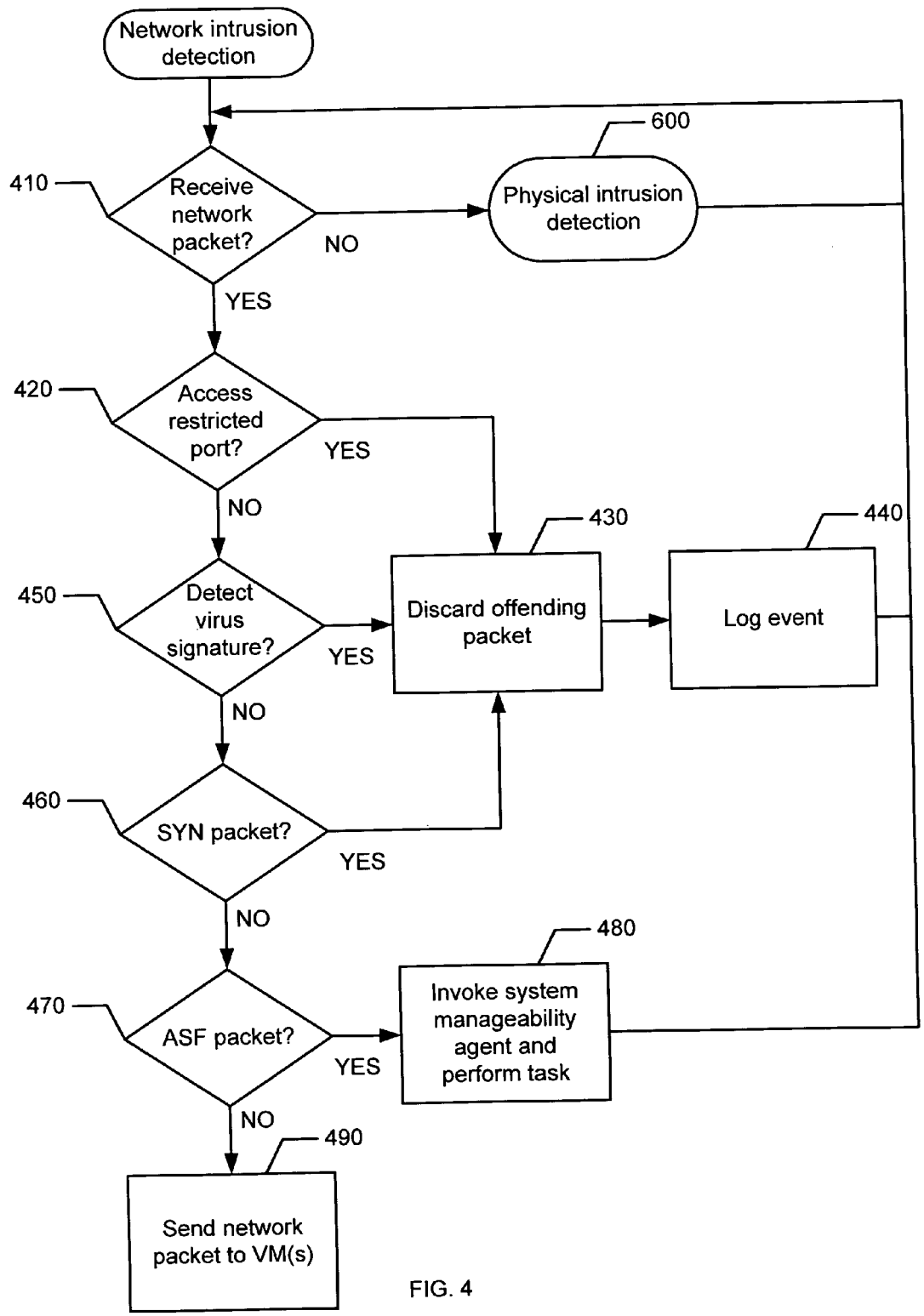
FIG. 4 is a flow diagram representation of example machine readable instructions that may detect network traffic intrusion of the example network traffic system shown in FIG. 2.

In the example of FIG. 4, the illustrated flow diagram 400 begins with the VMM 220 monitoring for incoming network packets to protect the network traffic system 200 from a network traffic intrusion event (block 410). If the VMM 220 fails to detect an incoming network packet, the VMM 220 proceeds to monitor for a physical security intrusion event of the network traffic system 200 as described in detail below (block 600). Otherwise if an incoming network packet is detected, the VMM 220 determines whether the incoming network packet is attempting to access a restricted port (block 420). Persons of ordinary skill in the art will readily appreciate that a port is an endpoint of a logical connection, where a server may provide a service and/or a client may access a service. In one example, the restricted port may be a transmission control protocol (TCP) port, a user datagram protocol (UDP) port, and/or any other port that supports other types of service. For example, ports 0 to 1024 may be restricted ports that are reserved for certain services. In one particular example, a structure query language (SQL) server is configured to update and retrieve information from a database. An SQL Slammer worm, which is one particular type of virus that affects SQL servers, exploits the SQL server at port 77. Accordingly, access to port 77 of the SQL server may be restricted to guard against the SQL Slammer worm. If the incoming network packet attempts to access one of the restricted ports of the network traffic system 200, the VMM 220 discards the incoming network packet (block 430), identifies and logs the network traffic intrusion event (block 440), and returns to monitoring for other incoming network packets (block 410). The log of network traffic intrusion events developed at block 440 by the VMM 220 is generated for evaluation by, for example, a system administrator.

If the incoming network packet is not attempting to access the restricted port, the VMM 220 performs packet-level virus scanning. In particular, the VMM 220 determines whether the incoming network packet is associated with a virus by monitoring the received network packet for a virus identifier such as a virus signature (block 450). Persons of ordinary skill in the art will readily appreciate that a virus is a program or a collection of instructions that causes some unexpected and typically, undesirable event to occur on the network traffic system 200. For example, the Melissa virus may be distributed as an e-mail attachment, which disables a number of safeguards (e.g., other virus protection) when opened. By monitoring the incoming network packet for a virus signature, the VMM 220 may protect the network traffic system 200. If the VMM 220 detects a virus signature in the incoming network packet, the VMM 220 discards the incoming network packet (block 430), identifies and logs the network traffic intrusion event (block 440), and returns to monitoring for other network packets (block 410).

If a virus signature is not detected (block 450), the VMM 220 prevents SYN (i.e., synchronous) attacks or SYN flooding, which is a form of denial of service attack directed to networks connected to the Internet. SYN flooding is initiated when a SYN packet (e.g., a transmission control protocol (TCP) connection request) is sent to the network traffic system 200. When the network traffic system 200 receives the SYN packet, the network traffic system 200 allocates resources to handle and track the new connection and responds by sending an acknowledgement (e.g., SYN-ACK packets) to a non-existing source address. The network traffic system 200 may continue to retransmit SYN-ACK packets several times. Thus, SYN flooding may occupy the resources of the network traffic system 200 and prevent users from connecting to the network traffic system 200. Accordingly, the VMM 220 determines whether the incoming network packet is a SYN packet to ensure that the resources of the network traffic system 200 are being used properly (block 460). If the incoming network packet is a SYN packet, the VMM 220 discards the incoming network packet (block 430), identifies and logs the network traffic intrusion event (block 440), and returns to monitoring for other network packets (block 410).

If the incoming network packet is not a SYN packet, the VMM 220 determines if the network packet is an alert standard format (ASF) packet (block 470). The ASF specification (version 2.0) developed by Distributed Management Task Force, Inc. (DMTF) defines remote control and alerting interfaces to server OS-absent environments. For example, the ASF specification defines a variety of system manageability agents to optimize on-site maintenance, system availability and performance, remote visibility of and access to the network traffic system 200 by a system administrator, and/or power consumption required to maintain remote connection. Additional information pertinent to the ASF specification is available at http://www.dmtf.org. If the VMM 220 determines that the network packet is an ASF packet, the VMM 220 invokes a system manageability agent and performs task (block 480), and returns to block 410. For example, the VMM 220 may update the ASF reset key. If the VMM 220 determines that the incoming network packet is not an ASF packet, the VMM 220 sends the incoming network packet to its proper destination (i.e., to one or more of the plurality of VMs 310) (block 490). Thus, the VMM 220 establishes a network traffic perimeter for the network traffic system 200 by filtering all incoming network traffic without additional logic to a network interface controller (not shown).

Figure 5:
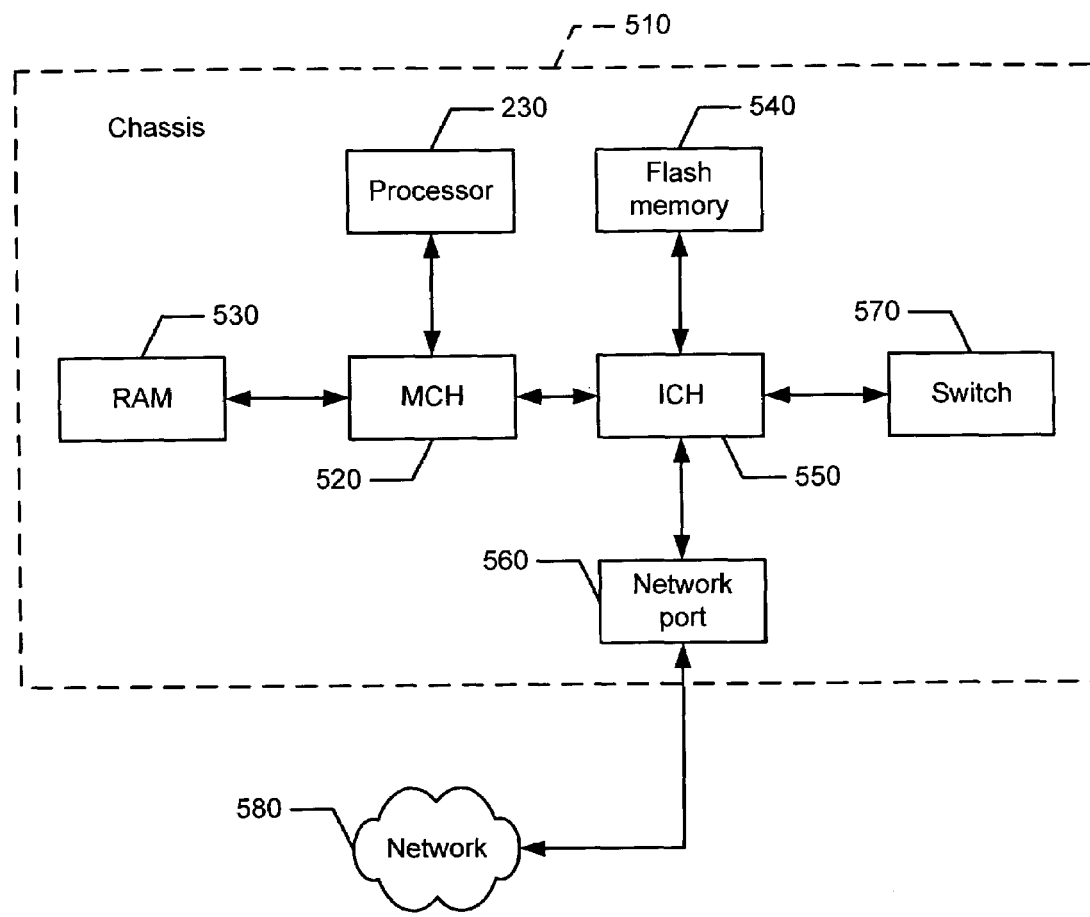
FIG. 5 is a block diagram representation of an example physical security perimeter of the example network traffic system shown in FIG. 2.

In the example of FIG. 5, the illustrated physical security perimeter 500 includes the processor 230, a chassis 510, a memory controller hub (MCH) 520, a random access memory (RAM) 530, a flash memory 540, an input/output controller hub (ICH) 550, a network port 560, and a chassis intrusion switch 570. The chassis 510 covers the components of the physical security perimeter 500. The flash memory 540 is a non-volatile storage used to store firmware including the BIOS 120 and the EFI 130. To initialize the VMM 220, the processor 230 accesses the firmware stored in the flash memory 540 via the MCH 520 and the ICH 550. Accordingly, the processor 230 may operate with virtual machine extensions (VMX) that include instructions such as virtual machine enter (VM_ENTER) and virtual machine exit (VM_EXIT). The network port 560 is coupled to the Internet and/or another network 580 to receive the incoming network packets as described above. The chassis intrusion switch 570 is configured to detect whether the chassis 510 is opened as described in detail below.

Figure 6:
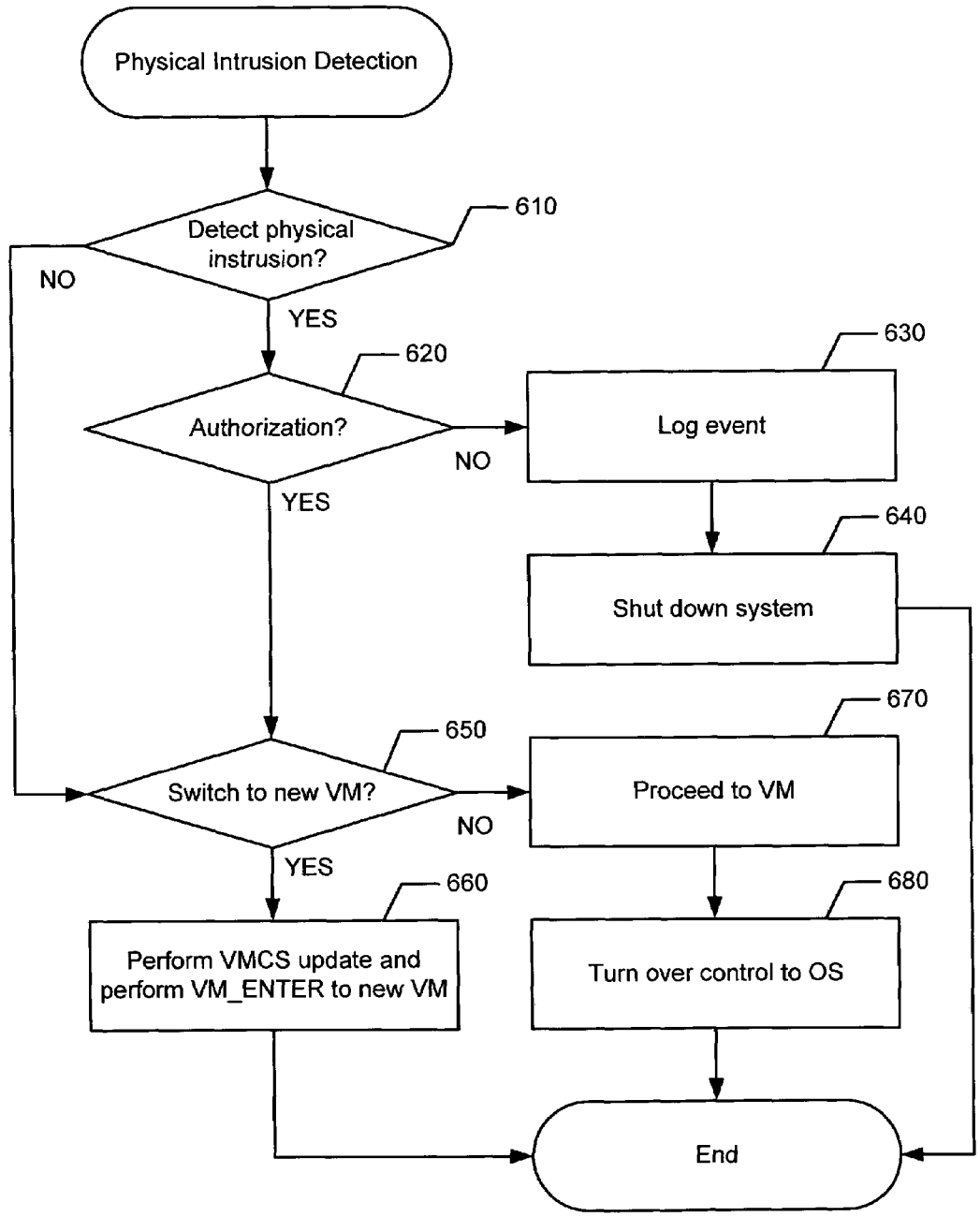
FIG. 6 is a flow diagram representation of example machine readable instructions that may detect physical security intrusion of the example security perimeter shown in FIG. 5.

In the example of FIG. 6, the illustrated flow diagram 600 begins with the VMM 220 (i.e., via the chassis intrusion switch 570) monitoring for a physical security intrusion event of the physical security perimeter 500 (block 610). For example, a user may open the chassis 510 to insert additional memory and/or replace memory such as RAM 530.

When a physical intrusion is detected (block 610), the VMM 220 determines if the user has authorization to open the chassis 510 (block 620). For example, the VMM 220 may provide the user with a number of opportunities to provide the correct password to disable the chassis intrusion switch 570. If the user is unauthorized (e.g., fails to provide the correct password), the VMM 220 identifies and logs the physical security intrusion event (block 630) and disables components within the physical security perimeter 500 to secure those components from unauthorized tampering by shutting the system down (block 640). At block 630, a log of physical security intrusion events identified by the VMM 220 is generated for evaluation by, for example, the system administrator. Otherwise if the user is authorized, the VMM 220 proceeds to determine whether to switch to a new VM (block 550) as described in detail below.

If the VMM 220 fails to detect a physical security intrusion event (block 610) or the user is authorized for the physical security intrusion event (block 620), the VMM 220 determines whether to switch to a new VM (block 650). The VMM 220 may operate in a time-slice manner such that the VMM 220 switches to a new VM and executes an OS associated with the new VM for a particular duration (e.g., 100 milliseconds). In network traffic system 200 shown in FIG. 2, for example, the VMM 220 may run OS #1 362 for 100 ms, switch over and run OS #2 372 for 100 ms, switch over and run OS #n 382 for 100 ms, and so on. Referring back to FIG. 6, if the VMM 220 switches to a new VM then the VMM 220 performs a virtual machine configuration structure (VMCS) update and VM_ENTER instruction to operate in the new VM (block 660). The VMCS update manipulates data structure in the processor 230. For example, the VMCS includes a field that identifies input/output port(s) to access the network traffic system 200. Otherwise, the VMM 220 proceeds to the current VM (block 670) and turns control over to the OS associated with the current VM (block 680).

Figure 7:
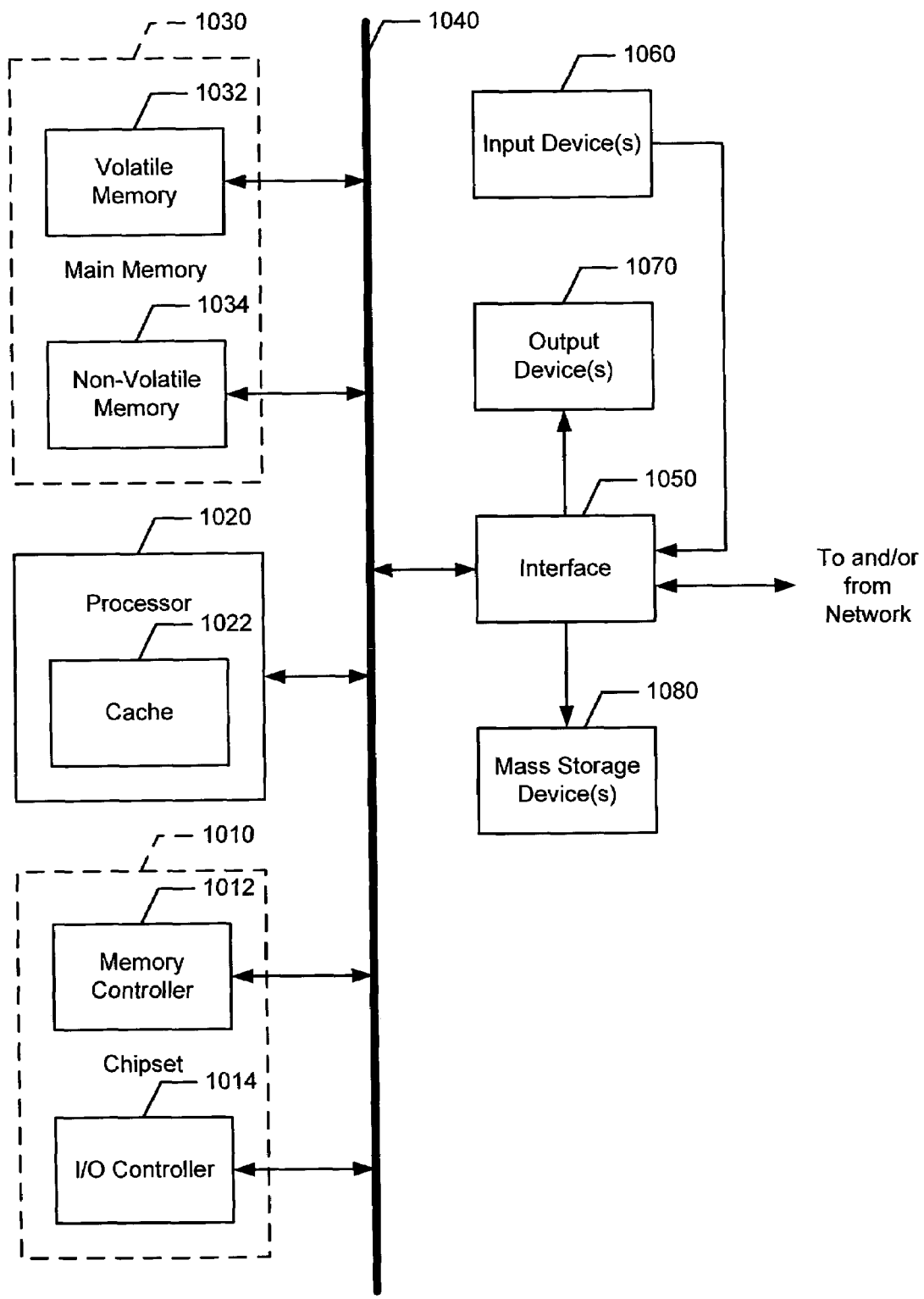
FIG. 7 is a block diagram representation of an example processor system.

As a result, the VMM 220 is configured to provide a network traffic perimeter and a physical security perimeter to any processor system (e.g., one shown as 1000 in FIG. 7). The methods and apparatus disclosed herein are well suited for processor systems associated with the Internet and/or a private internal network. However, persons of ordinary skill in the art will appreciate that the teachings of the disclosure may be applied to processor systems in other environments.

FIG. 7 is a block diagram of an example processor system 1000 adapted to implement the methods and apparatus disclosed herein. The processor system 1000 may be a desktop computer, a laptop computer, a notebook computer, a personal digital assistant (PDA), a server, an Internet appliance or any other type of computing device.

The processor system 1000 illustrated in FIG. 7 includes a chipset 1010, which includes a memory controller 1012 and an input/output (I/O) controller 1014. As is well known, a chipset typically provides memory and I/O management functions, as well as a plurality of general purpose and/or special purpose registers, timers, etc. that are accessible or used by a processor 1020. The processor 1020 is implemented using one or more processors. For example, the processor 1020 may be implemented using one or more of the Intel® Pentium® family of microprocessors, the Intel® Itanium® family of microprocessors, Intel® Centrino® family of microprocessors, and/or the Intel XScale® family of processors. In the alternative, other processors or families of processors may be used to implement the processor 1020. The processor 1020 includes a cache 1022, which may be implemented using a first-level unified cache (L1), a second-level unified cache (L2), a third-level unified cache (L3), and/or any other suitable structures to store data as persons of ordinary skill in the art will readily recognize.

As is conventional, the memory controller 1012 performs functions that enable the processor 1020 to access and communicate with a main memory 1030 including a volatile memory 1032 and a non-volatile memory 1034 via a bus 1040. The volatile memory 132 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 1034 may be implemented using flash memory, Read Only Memory (ROM), Electrically Erasable Programmable Read Only Memory (EEPROM), and/or any other desired type of memory device.

The processor system 1000 also includes an interface circuit 1050 that is coupled to the bus 1040. The interface circuit 1050 may be implemented using any type of well known interface standard such as an Ethernet interface, a universal serial bus (USB), a third generation input/output interface (3GIO) interface, and/or any other suitable type of interface.

One or more input devices 1060 are connected to the interface circuit 1050. The input device(s) 1060 permit a user to enter data and commands into the processor 1020. For example, the input device(s) 1060 may be implemented by a keyboard, a mouse, a touch-sensitive display, a track pad, a track ball, an isopoint, and/or a voice recognition system.

One or more output devices 1070 are also connected to the interface circuit 1050. For example, the output device(s) 1070 may be implemented by display devices (e.g., a light emitting display (LED), a liquid crystal display (LCD), a cathode ray tube (CRT) display, a printer and/or speakers). The interface circuit 1050, thus, typically includes, among other things, a graphics driver card.

The processor system 1000 also includes one or more mass storage devices 1080 configured to store software and data. Examples of such mass storage device(s) 1080 include floppy disks and drives, hard disk drives, compact disks and drives, and digital versatile disks (DVD) and drives.

The interface circuit 1050 also includes a communication device such as a modem or a network interface card to facilitate exchange of data with external computers via a network. The communication link between the processor system 1000 and the network may be any type of network connection such as an Ethernet connection, a digital subscriber line (DSL), a telephone line, a cellular telephone system, a coaxial cable, etc.

Access to the input device(s) 1060, the output device(s) 1070, the mass storage device(s) 1080 and/or the network is typically controlled by the I/O controller 1014 in a conventional manner. In particular, the I/O controller 1014 performs functions that enable the processor 1020 to communicate with the input device(s) 1060, the output device(s) 1070, the mass storage device(s) 1080 and/or the network via the bus 1040 and the interface circuit 1050.

While the components shown in FIG. 7 are depicted as separate blocks within the processor system 1000, the functions performed by some of these blocks may be integrated within a single semiconductor circuit or may be implemented using two or more separate integrated circuits. For example, although the memory controller 1012 and the I/O controller 1014 are depicted as separate blocks within the chipset 1010, persons of ordinary skill in the art will readily appreciate that the memory controller 1012 and the I/O controller 1014 may be integrated within a single semiconductor circuit.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A method to provide network traffic support and physical security support comprising:
    initializing a plurality of virtual machines, wherein each of the plurality of virtual machines operates like a complete physical machine that can run its own operating system;
    initializing a virtual machine monitor in a processor system during a pre-boot phase, wherein the virtual machine monitor is configured to manage the operation of the plurality of virtual machines;
    identifying at least one of a network traffic intrusion event and a physical security intrusion event with the virtual machine monitor,
    wherein identifying the network traffic intrusion event includes:
        detecting an incoming network packet;
        determining whether the incoming network packet is attempting to access a restricted port;
        discarding the network packet if the network packet is attempting to access a restricted port;
        performing packet level virus scanning on the network packet to determine if the network packet is associated with a virus;
        discarding the network packet if the network packet if the network packet is associated with a virus;
        determining whether the incoming network packet is a denial of service attack;
        discarding the incoming network packet if the incoming network packet is a denial of service attack;
        determining whether the incoming network packet is an alert standard format packet; and
        invoking a system manageability agent and performing a task if the incoming network packet is an alert standard format packet; and
    wherein identifying the physical security intrusion event includes:
        detecting a physical intrusion;
        determining whether a user has authorization to initiate the physical intrusion;
        determining which components of the processor system are vulnerable to the physical intrusion; and
        disabling the components of the processor system that are vulnerable to the physical intrusion if the user does not have authorization to initiate the physical intrusion.

2. A method as defined in claim 1, wherein detecting a physical intrusion comprises detecting opening of a chassis of the processor system via a chassis intrusion switch.

3. A method as defined in claim 1, wherein disabling the components of the processor system that are vulnerable to the physical intrusion if the user does not have authorization to initiate the physical intrusion comprises disabling the processor system in response to identifying the physical security intrusion event.

4. A method as defined in claim 1, wherein the processor system is associated with at least one of a private internal network or the Internet.

5. A machine readable medium storing instructions, which when executed, cause a machine to:
    initialize a plurality of virtual machines, wherein each of the plurality of virtual machines operates like a complete physical machine that can run its own operating system;
    initialize a virtual machine monitor in a processor system during a pre-boot phase, wherein the virtual machine monitor is configured to manage the operation of the plurality of virtual machines;
    identify at least one of a network traffic intrusion event and a physical security intrusion event with the VMM virtual machine monitor,
    wherein the instructions cause the machine to identify the at least one of the network traffic intrusion event within the virtual machine monitor by:
        detecting an incoming network packet;
        determining whether the incoming network packet is attempting to access a restricted port;
        discarding the network packet if the network packet is attempting to access a restricted port;
        performing packet level virus scanning on the network packet to determine if the network packet is associated with a virus;

discarding the network packet if the network packet if the network packet is associated with a virus;

determining whether the incoming network packet is a denial of service attack;

discarding the incoming network packet if the incoming network packet is a denial of service attack;

determining whether the incoming network packet is an alert standard format packet; and invoking a system manageability agent and performing a task if the incoming network packet is an alert standard format packet; and wherein the instructions cause the machine to identify the at least one of the physical security intrusion event within the virtual machine monitor by:

detecting a physical intrusion;

determining whether a user has authorization to initiate the physical intrusion;

determining which components of the processor system are vulnerable to the physical intrusion; and disabling the components of the processor system that are vulnerable to the physical intrusion if the user does not have authorization to initiate the physical intrusion.

6. A machine readable medium as defined in claim 5, wherein the instructions cause the machine to identify the physical security intrusion event within the virtual machine monitor by detecting opening of a chassis of the processor system via a chassis intrusion switch.

7. A machine readable medium as defined in claim 5, wherein the processor system is associated with at least one of a private internal network and the Internet.

8. A machine readable medium as defined in claim 5, wherein the machine readable medium comprises one of a programmable gate array, application specific integrated circuit, erasable programmable read only memory, read only memory, random access memory, magnetic media, and optical media.

9. An apparatus to provide network traffic support and physical security support comprising:

a machine readable medium configured to store firmware of a processor system;

a plurality of virtual machines initialized from the firmware during a pre-boot phase to operate like a complete physical machine that can run its own operating system;

a virtual machine monitor initialized from the firmware during a pre-boot phase to identify at least one of a network traffic intrusion event and a physical security intrusion event, wherein the identifying the network traffic intrusion event includes:

detecting an incoming network packet;

determining whether the incoming network packet is attempting to access a restricted port;

discarding the network packet if the network packet is attempting to access a restricted port;

performing packet level virus scanning on the network packet to determine if the network packet is associated with a virus;

discarding the network packet if the network packet if the network packet is associated with a virus;

determining whether the incoming network packet is a denial of service attack;

discarding the incoming network packet if the incoming network packet is a denial of service attack;

determining whether the incoming network packet is an alert standard format packet;

and invoking a system manageability agent and performing a task if the incoming network packet is an alert standard format packet; and wherein identifying the physical security intrusion event includes:

detecting a physical intrusion;

determining whether a user has authorization to initiate the physical intrusion;

determining which components of the processor system are vulnerable to the physical intrusion; and disabling the components of the processor system that are vulnerable to the physical intrusion if the user does not have authorization to initiate the physical intrusion.

10. An apparatus as defined in claim 9, wherein the physical security intrusion event comprises opening a chassis of the processor system.

11. An apparatus as defined in claim 9, wherein the machine readable medium comprises a flash memory.

* * * * *

UNITED STATES PATENT AND TRADEMARK OFFICE
CERTIFICATE OF CORRECTION

PATENT NO.         : 7,496,961 B2                                    Page 1 of 1
APPLICATION NO.    : 10/685882
DATED              : February 24, 2009
INVENTOR(S)        : Vincent J. Zimmer et al.

It is certified that error appears in the above-identified patent and that said Letters Patent is hereby corrected as shown below:

Col. 8, line 55 should read: --a physical security intrusion event with the virtual--

Signed and Sealed this

Seventh Day of April, 2009

JOHN DOLL
*Acting Director of the United States Patent and Trademark Office*